Feb. 2, 1937.  W. L. TRESEDER  2,069,565

PISTON

Filed Jan. 25, 1934

Inventor
WILLIAM LEWIS TRESEDER,
BY

Attorneys

UNITED STATES PATENT OFFICE 2,069,565

PISTON

William Lewis Treseder, Pontypridd, near Cardiff, South Wales

Application January 25, 1934, Serial No. 708,246
In Great Britain January 30, 1933

3 Claims. (Cl. 309—11)

This invention relates to pistons for internal combustion engines which are prone to piston noises when cold and susceptible to piston seizure when the cylinder temperature due to various causes becomes temporarily higher than normal.

The object of this invention is to provide a piston which will operate satisfactorily over a wide range of temperature without piston slap or seizure.

It is common practice to relieve the skirt of the piston intermediate of its length and this relieved portion usually includes that part of the exterior wall of the piston adjacent the gudgeon pin bosses. The relieved portion in most pistons plays very little part in dissipating heat from the piston because it is the coolest part of the piston being free from contact with the cylinder and only receiving heat from the piston head by conduction through the wall of the piston.

According to this invention the piston is provided with fins extending from the underside of the head to the gudgeon pin bosses and/or the inner wall of the relieved portion of the piston.

Figure 1:
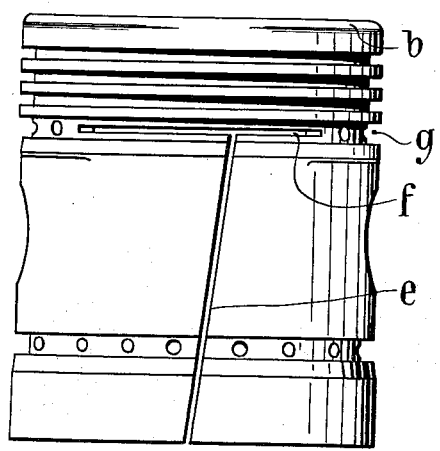
Figure 2:
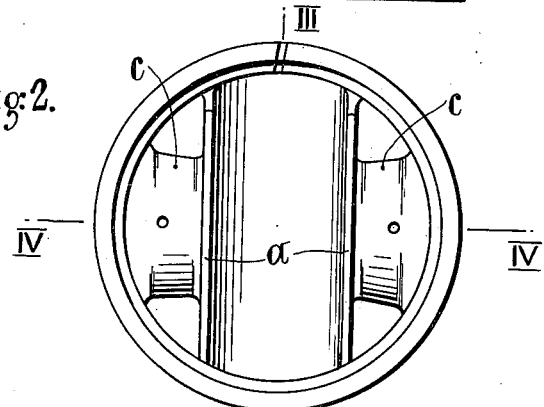
Figure 3:
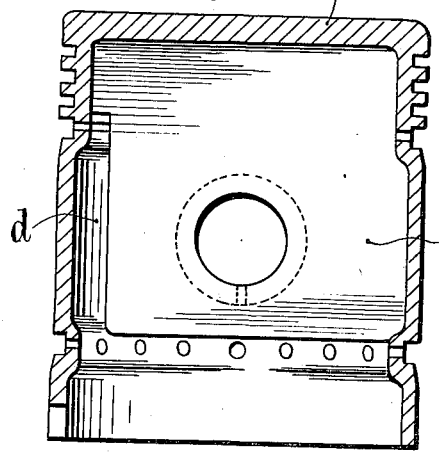
Figure 4:
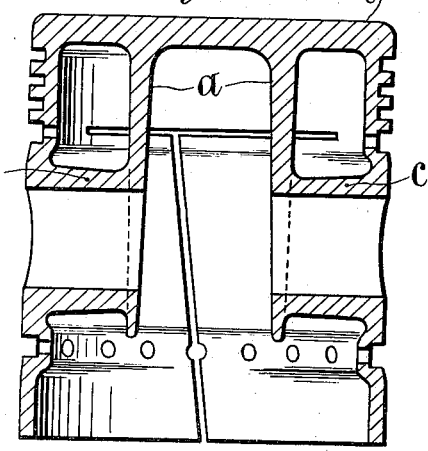

One form of piston made in accordance with this invention will now be described with reference to the accompanying drawing, wherein Figure 1 is a side elevation; Figure 2 is an underside plan view; Figure 3 is a sectional side elevation on the line 3—3, Figure 2; and Figure 4 is a sectional front elevation on the line 4—4, Figure 2.

The piston illustrated in the drawing is provided with two substantial fins $a$ parallel to one another and extending downwardly from the head $b$ to the inner ends of the gudgeon pin bosses $c$. The fins $a$ are of large cross section at the top where they merge into the piston head $b$ and are gradually reduced in thickness towards the gudgeon pin bosses. It is to be noticed that these fins are joined at one side for their whole length to the inner thrust wall of the piston, but on the other side they stop short of the piston wall for nearly their whole length leaving a substantial space $d$. The piston skirt is cut on the trail or anti-thrust side by a single diagonal cut $e$ extending from the bottom edge to a longitudinal slot $f$ in the piston groove $g$.

The cut $e$ is on that side of the piston to which the fins $a$ are not joined, this construction providing a certain degree of flexibility of the piston particularly towards the bottom without sacrificing any strength. By attaching the fins to the crown and thrust wall of the piston and the gudgeon pin bosses, continuity of heat flow is obtained from the upper surface of the crown of the piston down the fins to the mass of the gudgeon pin bosses and the specifically relieved areas adjacent to the gudgeon pin bosses, advantage being taken of utilizing areas not in frictional contact with the cylinder as radiative surfaces.

The interior lay-out improves the thermal resistance of the piston material in the hottest sections, producing a low temperature gradient along the crown of the piston. An unrestricted sweep of air and oil on the interior surfaces reduces the body temperature of the piston.

What I claim and desire to secure by Letters Patent is:—

1. A piston for an internal combustion engine comprising a head, a skirt directly attached to said head and having a thrust side and a trailing side, gudgeon pin bosses extending inwardly each from one side of the piston skirt and webs extending continuously across said head inside said skirt, one edge of said webs being joined to the thrust side of said skirt and the opposite edge extending across and separated from the trailing side thereof, each of said gudgeon pin bosses being directly joined both to said skirt and to one of said webs.

2. A piston for an internal combustion engine comprising a head, a skirt directly attached to said head and having a thrust side and a trailing side, gudgeon pin bosses extending each from one side of the piston skirt, webs extending continuously across said head inside said skirt, one edge of said webs being joined to the thrust side of said skirt and the opposite edge extending across and separated from the trailing side thereof, each of said gudgeon pin bosses being directly joined both to said skirt and to one of said webs, and at least one cut in the trailing side of said skirt to give flexibility thereto.

3. A piston for an internal combustion engine comprising a head, a skirt directly attached to said head and having a thrust side and a trailing side, gudgeon pin bosses extending each from one side of the piston skirt, webs extending continuously across the lower face of the head, and continuously along the thrust side from the head to a point below the pin bosses and across the interior of the piston with their other edges terminating short of the interior wall of the piston, the outer edges of the bosses emerging into the piston skirt, each of the gudgeon pin bosses being directly joined both to said skirt and to one of said webs, and at least one cut in the trailing side of the skirt to give flexibility thereto.

WILLIAM LEWIS TRESEDER.